United States Patent
Gindele et al.

(10) Patent No.: US 6,804,393 B2
(45) Date of Patent: Oct. 12, 2004

(54) METHOD OF CALCULATING NOISE FROM A DIGITAL IMAGE UTILIZING COLOR CROSS CORRELATION STATISTICS

(75) Inventors: Edward B. Gindele, Rochester, NY (US); Navid Serrano, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 675 days.

(21) Appl. No.: 09/753,092

(22) Filed: Jan. 2, 2001

(65) Prior Publication Data

US 2002/0126911 A1 Sep. 12, 2002

(51) Int. Cl.[7] .............. G06K 9/00; G06K 9/64; G06K 9/38; G06K 9/40
(52) U.S. Cl. .............. 382/167; 382/278; 382/270; 382/260
(58) Field of Search .............. 382/254–264, 382/276–278, 162–167, 265, 275, 270

(56) References Cited

U.S. PATENT DOCUMENTS 5,923,775 A * 7/1999 Snyder et al. .............. 382/172

* cited by examiner

Primary Examiner—Jon Chang
Assistant Examiner—Wes Tucker
(74) Attorney, Agent, or Firm—Raymond L. Owens

(57) ABSTRACT

A method of calculating a noise characteristic value for a source digital image includes receiving a source digital image including pixels corresponding to two or more different colors; using pixel values corresponding to a first color to produce at least one color correlation term for pixels corresponding to a second color which respectively indicate the extent of the noise content in the pixel values of the second color; and using the color correlation term to calculate a noise characteristic value for the pixels corresponding to the second color.

17 Claims, 4 Drawing Sheets

METHOD OF CALCULATING NOISE FROM A DIGITAL IMAGE UTILIZING COLOR CROSS CORRELATION STATISTICS

FIELD OF INVENTION

The present invention relates to a method, apparatus, and computer program for processing digital images to estimate noise.

BACKGROUND OF THE INVENTION

The color cross-correlation properties of photographic recording media have been used to produce enhanced renditions of digital images to formulate a color matrix transform used to enhance the appearance of scanned images. In U.S. Pat. No. 5,509,086 Edgar et al. disclose a method for correcting for the effects of crosscolor crosstalk between colors of a color image stored in an image storage medium and an imaging device used to scan the color image into a plurality of scanned images each corresponding to a color of the color image. The method Edgar et al. describe comprises the steps of a) identifying noise patterns in the plurality of scanned images; b) calculating crosscolor correlations between the identified noise patterns in the plurality of scanned images; and c) correcting for color crosstalk in each of the scanned images according to the crosscolor correlations. This method makes explicit use of measured color cross-correlation in digital images to formulate a color matrix transform to enhance the appearance of the scanned images.

The color cross-correlation properties of photographic recording media have been used to produce enhanced renditions of digital images based on applying a noise reduction algorithm to digital images. In U.S. Pat. No. 5,956,432, Ohta discloses an image processing apparatus designed to remove noise from a color digital image. The apparatus includes detection means for detecting the correlation between color-component signals of an input image signal, and a smoothing means for performing smoothing processing on the image signal inversely proportional to the correlation detected by the detection means.

Image structure content relating to natural scene objects exhibits a different cross-color correlation property than does the stochastic noise content resulting from the imaging medium. This cross-color correlation property has been used to advantage for the formation of a color transform as described by Edgar et al. and for the purposes of noise removal by as described by Ohta.

SUMMARY OF THE INVENTION

It is therefore an object of the present invention to provide an improved noise estimation algorithm that takes advantage of the cross-color correlation property of images, thus improving other image enhancement algorithm and that relies on prior knowledge of the noise characteristics of digital images.

This object is achieved by a method of calculating a noise characteristic value for a source digital image, comprising the steps of:

a) receiving a source digital image including pixels corresponding to two or more different colors;

b) using pixel values corresponding to a first color to produce at least one color correlation term for pixels corresponding to a second color which respectively indicate the extent of the noise content in the pixel values of the second color; and c) using the color correlation term to calculate a noise characteristic value for the pixels corresponding to the second color.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
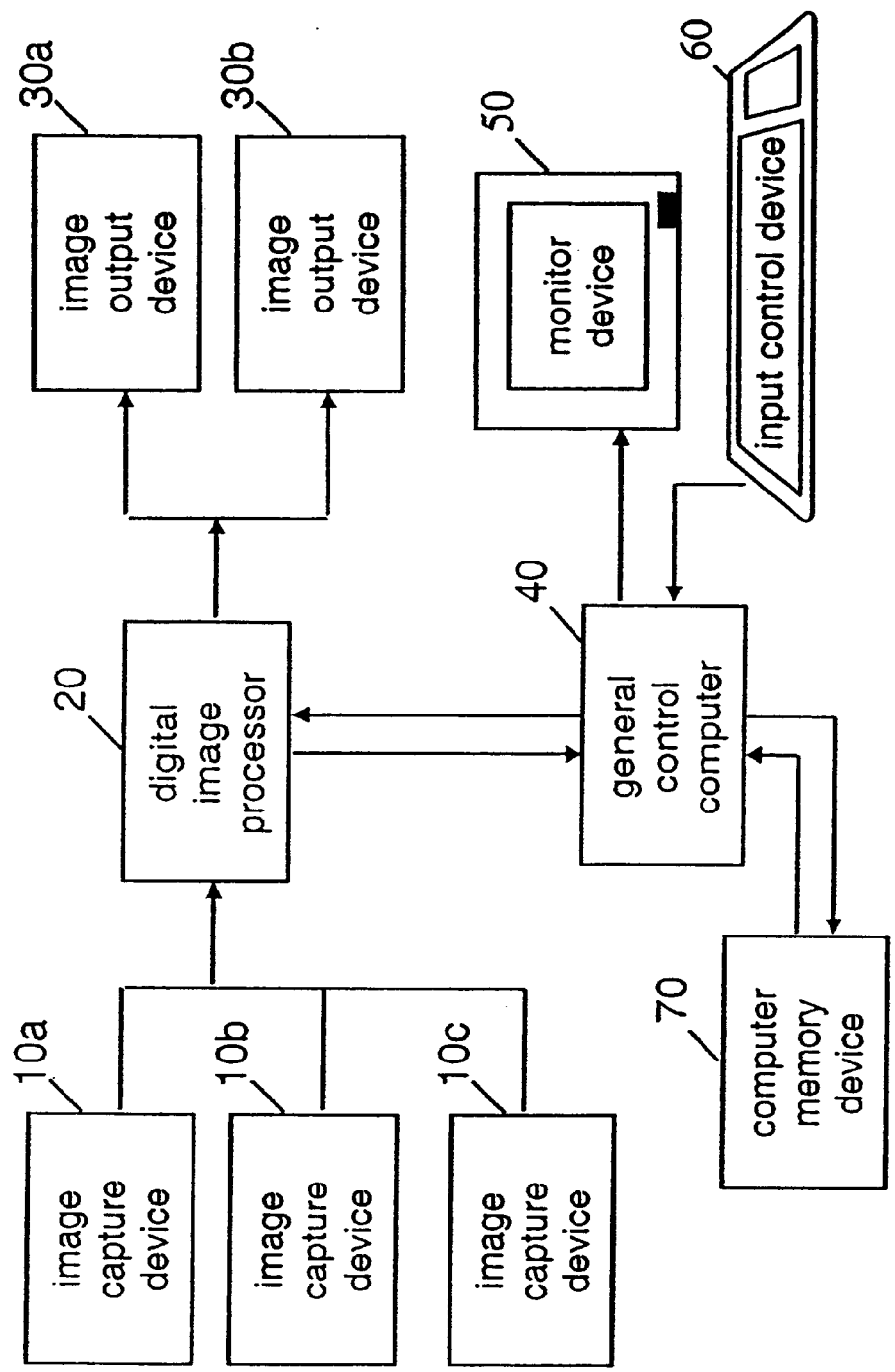
FIG. 1 is a functional block diagram showing the component parts of an apparatus implementation suitable for practicing the present invention.

The present invention may be implemented in computer hardware. Referring to FIG. 1, the following description relates to a digital imaging system which includes an image capture device 10a, a digital image processor 20, an image output device 30a, and a general control computer 40. The system may include a monitor device 50 such as a computer console or paper printer. The system may also include an input device control 60 for an operator such as a keyboard and or mouse pointer. Multiple capture devices 10a, 10b, and 10c are shown illustrating that the present invention may be used for digital images derived from a variety of imaging devices. For example, FIG. 1 may represent a digital photofinishing system where the image capture device 10a is a conventional photographic film camera for capturing a scene on color negative or reversal film, and a film scanner device for sensing the developed image on the film and producing a digital image. Although the term scanner can refer to digital imaging devices that physically scan or move a sensing element past a photographic film sample, the present invention also includes photographic film scanners and print scanners that employ a stationary image sensing device to generate a digital image. The digital image processor 20 provides the means for processing the digital images to produce pleasing looking images on the intended output device or media. Multiple image output devices 30a and 30b are shown illustrating that the present invention may be used in conjunction with a variety of output devices which may include a digital photographic printer and soft copy display. The digital image processor 20 processes the digital image to adjust the overall brightness, tone scale, image structure etc. of the digital image in a manner such that a pleasing looking image is produced by an image output device 30a.

Those skilled in the art will recognize that the present invention is not limited to just these mentioned image processing modules.

The general control computer 40 shown in FIG. 1 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well known computer system, such as a personal computer.

It should also be noted that the present invention implemented in a combination of software and/or hardware is not limited to devices which are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the image capture device 10a corresponding to the geometrical domain of the pixel. For color imaging applications a digital image will typically consist of red, green, and blue digital image channels. Other configurations are also practiced, e.g. cyan, magenta, and yellow digital image channels. Motion imaging applications can be thought of as a time sequence of digital images. Those skilled in the art will recognize that the present invention can be applied to, but is not limited to, a digital image channel for any of the above mentioned applications. Although the present invention describes a digital image channel as a two dimensional array of pixel values arranged by rows and columns, those skilled in the art will recognize that the present invention can be applied to mosaic (non rectilinear) arrays with equal effect.

Figure 2:
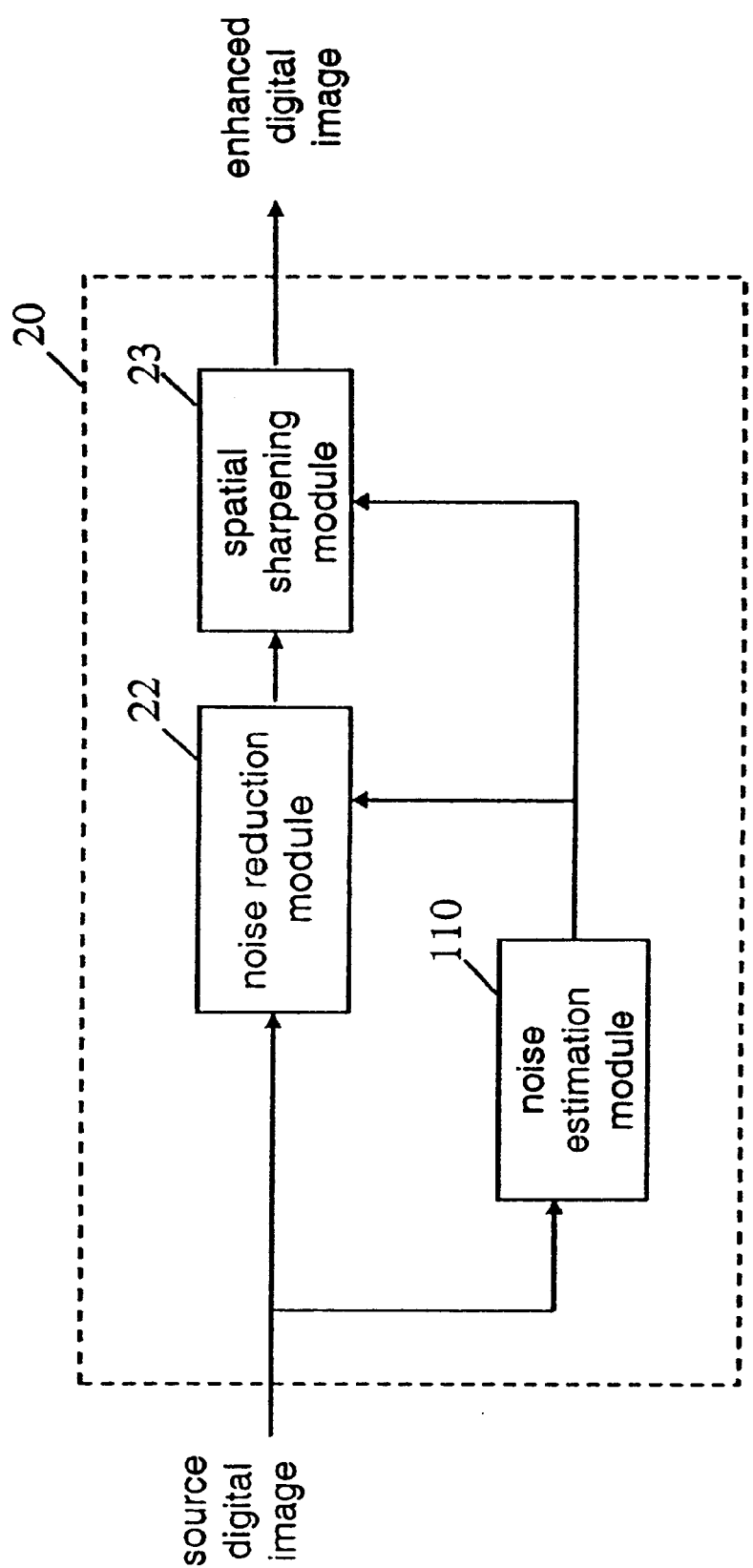
FIG. 2 is a functional block diagram of the digital image processor shown in FIG. 1.

The digital image processor 20 shown in FIG. 1 is illustrated in more detail in FIG. 2. The general form of the digital image processor 20 employed by the present invention is a cascaded chain of image processing modules. The source digital image 101 is received by the digital image processor 20 which produces on output an enhanced digital image 102 and a local noise characteristic table 105, i.e. a table of noise characteristic values. The noise estimation module 110 receives the source digital image 101 and produces the local noise characteristic table 105. Each image processing module contained within the digital image processor 20 receives a digital image, modifies the digital image, produces a processed digital image and passes the processed digital image to the next image processing module. The two enhancement transform modules shown within the digital image processor 20 are a noise reduction module 22 and a spatial sharpening module 23. These two modules use the local noise characteristic table 105 produced by the noise estimation module 110 to produce the enhanced digital image 102. Those skilled in the art will recognize that the any other image processing module that utilizes a noise characteristic table can be used with the present invention.

Figure 3:
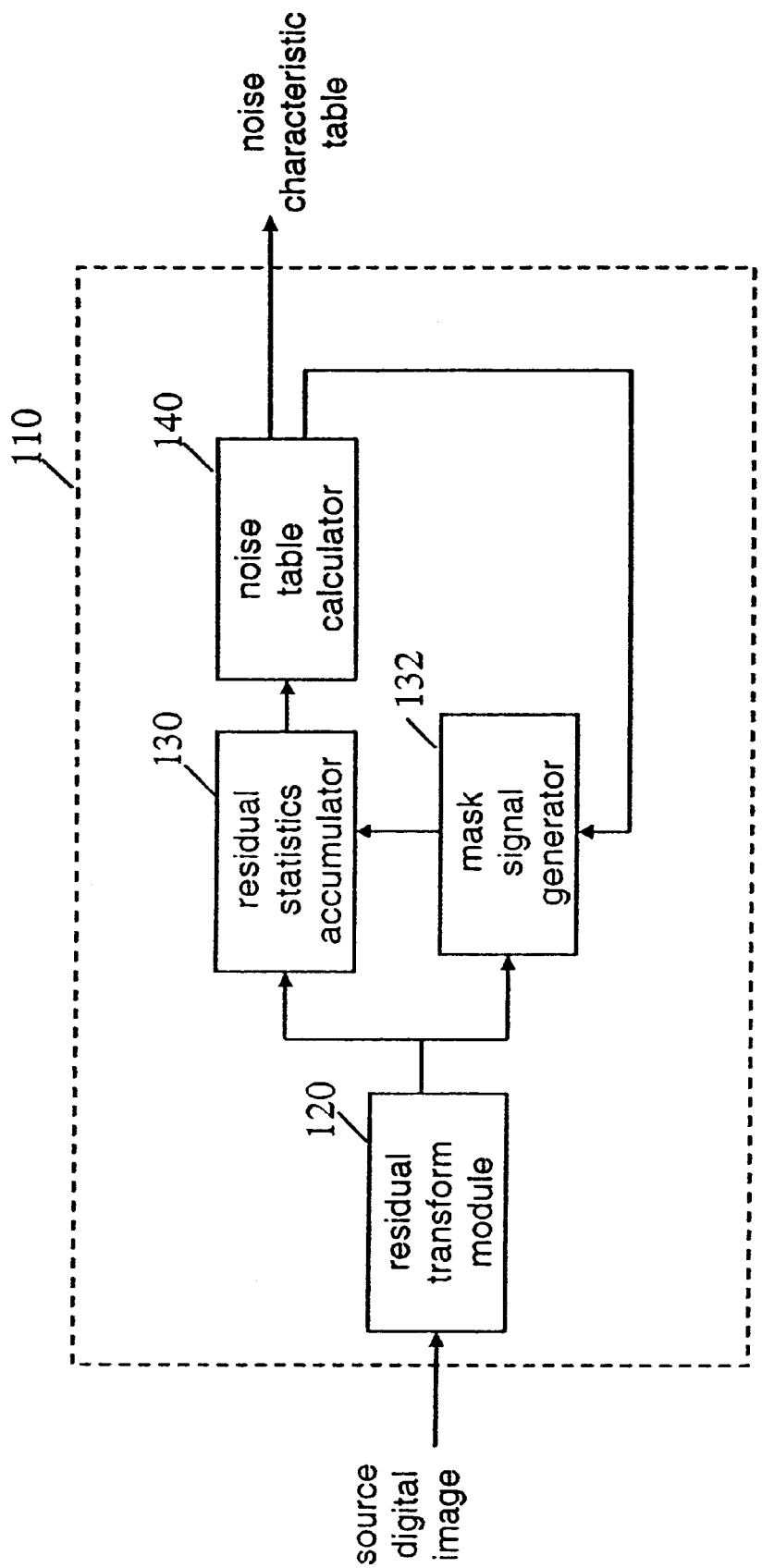
FIG. 3 is a function block diagram of the noise estimation module shown in FIG. 2.

The noise estimation module 110 shown in FIG. 2 is illustrated in more detail in FIG. 3. The source digital image 101 includes pixels corresponding to two or more different colors and typically includes three digital image channels that have pixels corresponding to red, green, and blue colors. The residual transform module 120 receives the source digital image 101 and uses a spatial filter and the pixel data of the source digital image 101 to calculate a residual digital image, i.e. a residual pixel value corresponding to each original pixel value in the source digital image 101. Thus, the residual digital image includes color pixels having pixel values corresponding to the two or more different colors of the source digital image 101. The residual statistics accumulator 130 receives the residual digital image and calculates a set of approximate residual histograms from the residual digital image. The noise table calculator 140 receives the set of approximate residual histograms and produces an approximate noise characteristic table 106. The mask signal generator 132 receives the residual digital image and the approximate noise characteristic table 106 and calculates a masking digital image, i.e. a masking pixel value corresponding to each original pixel value in the source digital image 101. The masking digital image and the residual digital image are received by the residual statistics accumulator 130 which calculates a set of local residual histograms. The noise table calculator 140 receives the set of local residual histograms and produces the local noise characteristic table 105.

The residual transform module 120 performs a spatial filtering operation on the pixel data of the source digital image 101. That is, a residual pixel value is generated for each original pixel value in the source digital image 101. For each pixel of interest, a combination of pixel values sampled from a local region of pixels is used to form the residual pixel value. Since the source digital image 101 is a color digital image, the residual transform module 120 performs the spatial filtering operation on each color digital image channel and forms a residual pixel value for each pixel of each color digital image channel. The preferred embodiment of the present invention uses a two-dimensional Laplacian spatial filter as the spatial filter to form the residual pixel values. The Laplacian spatial filter calculates a local arithmetic mean value from the value of pixel sampled from the local region of pixels about the pixel of interest and subtracts the value of the pixel of interest from the local arithmetic mean value. A local region of 3 by 3 pixels is used. The Laplacian spatial filter is convolution spatial filter with an associated convolution kernel of:

$$\begin{matrix} 1 & 1 & 1 \\ 1 & -1 & 1 \\ 1 & 1 & 1 \end{matrix} \quad (1)$$

Although the preferred embodiment of the present invention uses a two dimensional Laplacian spatial filter, those skilled in the art will recognize that the present invention can be practiced with other spatial filters, such as but not limited to, one-dimensional Laplacian spatial filters.

The pixel data of the source digital image 101 can be conceptualized as having two components—a signal component relating to photographed objects and a noise component. The resulting residual pixel values have statistical properties that have a closer relationship to the noise component of the pixel data of the source digital image 101 than the signal component. Although the noise component can contain sub-components, the stochastic sub-component of the noise component is well modeled by a zero mean Gaussian probability distribution function. To first order, the noise component of the pixel data of the source digital image 101 can be characterized by a standard deviation and a mean value of zero. To second order, standard deviation of the noise component can be modeled as being signal and color channel dependent.

The properties of the signal components and noise components for most images are different with regard to color cross correlation. In particular, the signal component of images exhibits much more color cross correlation than to does the noise component. For example, in a typical digital image including a red, green, and blue digital image channel, the noise component of the red digital image channel is largely uncorrelated with the noise component of either the blue or green digital image channel. That is, the local fluctuations in the digital image channels are not related to one another. Conversely, the signal components of the red, green, and blue digital image channels are correlated due to the fact that there exists a physical relationship between the pixel values of the three digital image channels induced by the image acquisition process. The scene illumination and scene objects represented in the pixel data are physically related.

The residual statistics accumulator 130 analyzes the residual pixel values and records these values in the form of a set of approximate residual histograms as a function of the color digital image channel and pixel value. Therefore a given approximate residual histogram $H_{ik}$ relates to the $i^{th}$ color digital image channel and the $k^{th}$ pixel value sub-range. For each pixel of interest denoted by $p_{mn}$ responding to the $m^{th}$ row and $n^{th}$ column location) in the processed color digital image channel, a histogram bin index k is computed. For example, if the numerical range of pixel values is from 0 to 255 there can be as many as 256 useful histograms, i.e. one histogram for each possible numerical pixel value. In general, most noise sources can be characterized as having noise standard deviations that are slow functions of the pixel value. Therefore, the preferred embodiment of the present invention uses 8 histograms to cover the numerical pixel value range of 0 to 255. Thus, the calculated histogram index bin and the corresponding sub-range pixel values are given by the following Table 1.

TABLE 1

| histogram bin index | sub-range pixel values | average pixel value |
| --- | --- | --- |
| 0 | 0 to 31 | 16 |
| 1 | 32 to 63 | 48 |
| 2 | 64 to 95 | 80 |
| 3 | 96 to 127 | 112 |
| 4 | 128 to 159 | 144 |
| 5 | 160 to 191 | 176 |
| 6 | 192 to 233 | 208 |
| 7 | 234 to 255 | 240 |

Those skilled in the art will recognize that the present invention can be practiced with digital image pixel data with any numerical range. The number of approximate residual histograms used for each color digital image channel will depend on the accuracy of results required for the particular digital imaging application.

Although each approximate residual histogram records statistical information for a range of pixel values for a given color digital image channel, the approximate residual histogram records the frequency of residual pixel values associated with each pixel of interest $p_{mn}$. Since the expected mean of the distribution of residual pixel values is zero, the residual pixel values exhibit both positive and negative values. Therefore, the approximate residual histogram must record the frequency, i.e. the number of instances of residual pixel values, of all possible instances of residual pixel values. For the example above, the residual pixel values can range from −255 to +255. While is possible to construct local residual histograms with as many recording bins as there are possible instances of residual pixel values, in general it is not necessary. For most digital images only a small percentage of residual pixel values exhibit values near the extremes of the possible range. The present invention uses 101 total recording bins for each approximate residual histogram. On of the recording bins corresponds to residual pixel values of 50 and greater. Similarly, one other recording bin corresponds to residual pixel values of −50 and lower. The other 99 recording bins each correspond to a single residual pixel value for the numerical range from −49 to +49.

Referring to FIG. 3, the noise table calculator 140 receives the set of residual histograms and calculates a noise characteristic table. The noise table calculator 140 is used twice within the noise estimation module 110, first to calculate the approximate noise characteristic table 106 and a second time to calculate the local noise characteristic table 105. Since the operation of the noise table calculator 140 is the same in both cases, the operation will be discussed in general form.

For each of the residual histograms relating to a particular color digital image channel and pixel value range, the noise table calculator 140 derives a noise standard deviation value from the value of the recording cells of the updated residual histogram. The preferred embodiment of the present invention uses equation (2) to calculate the standard deviation value $\sigma_n$:

$$\sigma_n = ((1/N)\Sigma_k RC_v(k)(x-x_m)^2)^{1/2} \qquad (2)$$

where the variable x represents the average pixel value of the residual pixel values accumulated in the $k^{th}$ recording cell as given by Table (1) and $RCv(k)$ represents the number of residual pixel values accumulated by the $k^{th}$ recording cell.

$$x = V(k) \qquad (3)$$

The variable $x_m$ represents the arithmetic mean value of the corresponding residual pixel values given by equation (4) and, $$x_m = (1/N)\Sigma_k x \qquad (4)$$

and the variable N represents the total number of residual pixel values recorded by the updated residual histogram given by equation (5):

$$N = \Sigma_k RC_v(k) \qquad (5)$$

An alternative embodiment of the present invention performs an alpha-trimmed standard deviation calculation. In this embodiment a first approximation to the standard deviation $\sigma_e$ is calculated using the method described above. The calculation of $\sigma_n$ is then calculated using the only recording cells with corresponding residual pixel values that are within a limited range of zero. The formula for the standard deviation calculation $\sigma_n$ is given by equation (6):

$$\sigma_n = ((1/N)\Sigma_k \gamma RC_v(k)(x-x_m)^2)^{1/2} \qquad (6)$$

where the variable γ is given by equation (7)

γ=1 if $|x| < \alpha\sigma_e$

γ=0 if $|x| >= \alpha\sigma_e$ \qquad (7)

where the variable α is set to 3.0. This alternative embodiment of the present invention is more computationally intensive than the preferred embodiment but does yield more accurate results via the rejection of out-lying residual pixel values from adversely contributing to the calculation of the standard deviation $\sigma_n$ value.

Table 2 below is an example of an approximate noise characteristic table produced with the present invention.

TABLE 2

| average pixel value | Standard deviation of red channel | Standard deviation of green channel | Standard deviation of blue channel |
|---|---|---|---|
| 16 | 3.25 | 3.15 | 3.32 |
| 48 | 3.71 | 4.21 | 10.97 |
| 80 | 4.22 | 5.33 | 16.96 |
| 112 | 5.21 | 6.05 | 20.57 |
| 144 | 6.26 | 11.05 | 19.52 |
| 176 | 7.03 | 15.03 | 22.28 |
| 208 | 5.91 | 18.70 | 17.18 |
| 240 | 5.24 | 18.26 | 16.68 |

Those skilled in the art should recognize that the present invention can be practiced with calculated quantities other than the standard deviation that relate to the noise present in digital images. For example, the statistical variance or statistical median can also be derived from the residual histograms and be used to form a table of noise characteristic values.

The present invention uses a set of residual histograms to record the calculated statistics. A set of histograms is an example of a statistical table from which a noise characteristic table can be derived. Thus, the set of residual histograms constitutes a statistical table. Those skilled in the art should recognize that the present invention can be practiced with other forms of statistical tables. For example, the residual digital images could be stored and serve as a statistical table.

The present invention exploits the color cross correlation properties of the signal and noise components of images to calculate noise characteristic tables with improved accuracy. Referring to FIG. 3, mask signal generator 132 receives the approximate noise characteristic table 106 from the noise table calculator 140 and the residual digital image from the residual transform module 120. For a pixel of interest located at the $i^{th}$ row and $j^{th}$ column, let the variables $\delta r_{ij}$, $\delta g_{ij}$, and $\delta b_{ij}$ represent the red, green, and blue residual pixel values of the residual digital image. Similarly, let the noise standard deviation values from the approximate noise characteristic table be denoted by $\sigma_{ij\,red}$, $\sigma_{ij\,grn}$, and $\sigma_{ij\,blu}$ where the standard deviation values are obtained by using the source digital image pixel values ($r_{ij}$, $g_{ij}$, and $b_{ij}$) as indices into the approximate noise characteristic table look-up-tables. Three color cross product terms $\omega_{rg}$, $\omega_{rg}$ and $\omega_{br}$ are calculated by multiplying the residual pixel values from different digital image channels together and normalizing each color cross product term by the corresponding color standard deviation values as given by equation (8):

$$\omega_{rg} = \frac{\delta r_{ij} \delta g_{ij}}{\sigma_{ij\,red}\sigma_{ij\,grn}} \qquad (8)$$

$$\omega_{gb} = \frac{\delta g_{ij} \delta b_{ij}}{\sigma_{ij\,grn}\sigma_{ij\,blu}}$$

$$\omega_{br} = \frac{\delta b_{ij} \delta r_{ij}}{\sigma_{ij\,blu}\sigma_{ij\,red}}$$

Thus, a color cross product term is calculated for each combination of different colors for the pixel of interest in the residual digital image. The three color cross product terms $\omega_{rg}$, $\omega_{rg}$ and $\omega_{br}$ are combined to form a color cross correlation weighting factor $\Omega$ as given by equation (9):

$$\Omega_{mn}=|\omega_{rg}+\omega_{gb}+\omega_{br}| \qquad (9)$$

Equation (9) represents a simple formula using the sum of the values of the color cross product terms to form the color cross correlation weighting factor. In highly structured regions of images the $\Omega$ values are large while in highly unstructured regions the value of $\omega$ is close to zero. An important aspect of the formulation of the cross correlation weighting factor is the multiplication of the residual pixel values of different color pixels. Also important is the normalizing factor in the denominator of the color cross product terms which is based on the expected level of noise corresponding to the residual pixel values.

The preferred embodiment of the present invention uses a more complicated mathematical formula to calculate the color cross correlation weighting factor $\Omega_{mn}$ as given by equation (10):

$$\Omega_{mn}=|\omega_{rg}|+|\omega_{gb}|+|\omega_{br}| \qquad (10)$$

Here the color cross correlation weighting factor $\omega_{mn}$ is calculated as the sum of the absolute values of the individual the color cross product terms. The color cross product terms can assume both negative and positive values. Thus, using the absolute values of the individual the color cross product terms provides a more robust measure of image structure content.

In an alternative embodiment of the present invention a more traditional formulation of statistical correlation is used to calculate the color cross correlation weighting factor $\Omega_{mn}$ as given by equation (11):

$$\Omega_{mn}=(\omega_{rg}^2+\omega_{gb}^2+\omega_{br}^2)^{1/2} \qquad (11)$$

Here the color cross correlation weighting factor $\Omega_{mn}$ is calculated as the sum of the squares of the individual the color cross product terms.

The color cross correlation weighting factor $\Omega_{mn}$ is a numerical value calculated for each corresponding pixel in the source digital image 101. The numerical range of $\Omega_{mn}$ is from 0.0 to values greater than 1.0. Low values of $\Omega_{mn}$ correspond to noisy image regions and hence more accurate statistics for noise estimation. Conversely, high values of $\Omega_{mn}$ correspond to highly structured image regions and hence less accurate statistics for noise estimation. Thus, the value of color cross correlation weighting factor $\Omega_{mn}$ is an indication of the noise estimation accuracy of a given pixel.

Figure 4:
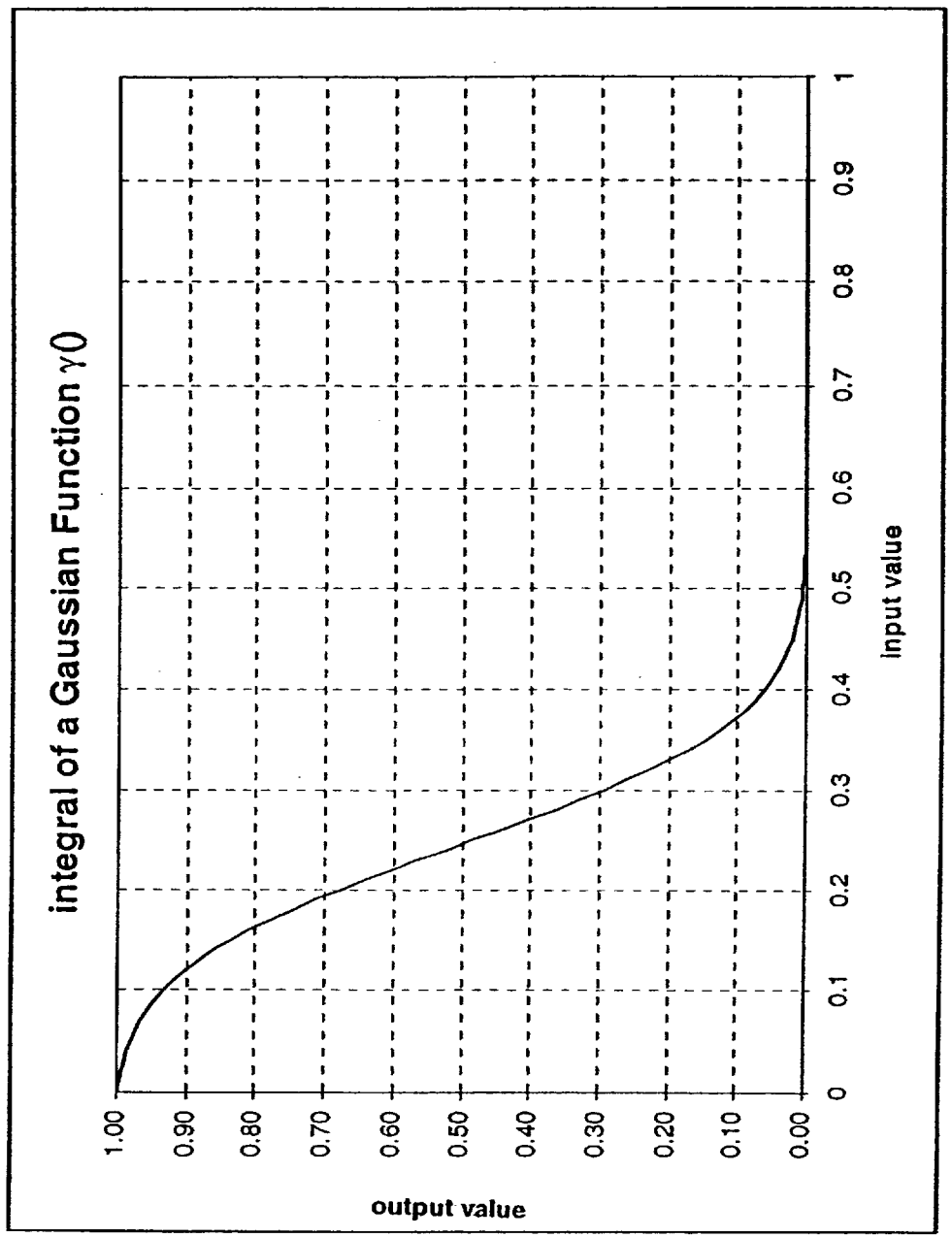
FIG. 4 is a graph of the reshaping function used to calculate the masking weighting factors.

Although color cross correlation weighting factor $\Omega_{mn}$ can be used directly to differentiate noisy image regions form structured image regions, the accuracy of the calculated noise characteristic tables can be improved if the color cross correlation weighting factor $\Omega_{mn}$ is modified by a shaping function. The color cross correlation weighting factor $\Omega_{mn}$ is used to calculate a masking weighting factor $\phi_{mn}$. The preferred embodiment of the present invention uses a form of a an integral-of-a-Gaussian function $\gamma(\ )$ to non-linearly modify the numerical values of the color cross correlation weighting factor $\Omega_{mn}$ given by equations (12) and (13) as:

$$\phi_{mn}=\gamma(\Omega_{mn}) \qquad (12)$$

where $$\gamma(x) = 1 - \frac{y_o + \sum e^{-(x-x_t)^2/2\sigma_x^2}}{y_o + \sum e^{-(x_{max}-x_t)^2/2\sigma_x^2}} \quad (13)$$

where $y_o$ represents a minimum weighting value (set to 0.0), $x_{max}$ represents a maximum abscissa value of the variable x (set to 1.0), $x_t$ represents a transition parameter and where $\sigma_x$ represents a transition rate parameter. Experimentation with digital images derived from natural scene photography has yielded optimal or near optimal values of 0.25 for $x_t$ and 0.08 for $\sigma_x$. An example of the Gamma function $\gamma(x)$ is shown in FIG. 4.

An alternative embodiment of the present invention uses a thresholding operation for to calculate the masking weighting factor $\phi_{mn}$ from the color cross correlation weighting factor $\Omega_{mn}$ given by equations (14):

$\phi_{mn}=1$ for $\Omega_{mn}<x_t$ $\phi_{mn}=0$ for $\Omega_{mn}>=x_t$ \quad (14)

This alternative embodiment of the present invention is computationally faster than the preferred embodiment method. The color cross correlation weighting factor $\Omega_{mn}$ and the masking weighting factor $\phi_{mn}$ are both calculated for each correspond pixel in the source digital image 101. The masking weighting factors $\phi_{mn}$ assembled as a 2-dimensional array constitute a masking digital image. Those skilled in the art will recognize that any of the formulations of the variables $\Omega_{mn}$ and $\phi_{mn}$ as given by equations (8), (9), (10), (11), (12), (13), and (14) can represent a color cross correlation weighting factor or a masking weighting factor.

The masking digital image is calculated by the mask signal generator 132 shown in FIG. 3. The residual statistics accumulator 130 receives the masking digital image and the residual digital image and generates a set of local residual histograms. This process is similar to the processed described above for the calculation of the set of approximate residual histograms. However, in the calculation of the local residual histograms, the masking weighting factor $\phi_{mn}$ multiplied by the residual pixel value $p_{mn}$ is recorded instead of just the residual pixel value. Thus, the difference between the statistics of the approximate residual histograms and the local residual histograms is the weighting of the residual pixel values by the masking weighting factor. The floating point description of the masking weighting factor can be easily overcome for integer based implementations by scaling the masking weighting factors by 100. For the alternative embodiment of the present invention for which the masking weighting factor $\phi_{mn}$ is either 0 or 1, the local residual histograms essentially record only the statistics for residual pixel values with corresponding color cross correlation weighting factors below the designated threshold value. Thus, the resultant local residual histograms for all embodiments emphasize the statistics from noisy regions of the source digital image 101. The noise table calculator 140 receives the set of local residual histograms and calculates the local noise characteristic table 105 in the same fashion as described above.

Table 3 below shows the resultant local noise characteristic table calculated with the local residual histograms derived from the approximate residual histograms and the approximate noise characteristic table shown in Table 2.

TABLE 3

| average pixel value | Standard deviation of red channel | Standard deviation of green channel | Standard deviation of blue channel |
| --- | --- | --- | --- |
| 16 | 1.39 | 1.31 | 1.38 |
| 48 | 1.63 | 1.45 | 4.69 |
| 80 | 1.68 | 1.77 | 8.00 |
| 112 | 1.80 | 2.79 | 8.86 |
| 144 | 1.81 | 4.53 | 7.85 |
| 176 | 2.05 | 6.11 | 9.95 |
| 208 | 2.00 | 8.06 | 6.78 |
| 240 | 1.71 | 2.92 | 9.49 |

The noise standard deviation values shown in Table (3) are almost always lower in value than the corresponding table entry of approximate noise standard deviation values shown in Table (2). This is due to the fact that the color cross correlation weighting factor $\Omega_{mn}$ is used to exclude residual pixel values that have a low likelihood of providing an accurate noise estimate from contributing to the calculation of the local noise characteristic values. The excluded residual pixel values usually have larger than average values thus resulting in lower estimates of noise. In general, these excluded pixels relate to regions in digital images dominated by image structure content.

The calculation of the local noise characteristic values explicitly uses pixel values of one color to estimate the noise corresponding to pixels of a different color. The color cross product terms must be calculated by using pixel values corresponding to two or more different colors. Also, the color cross product terms are normalized by the approximate noise standard deviation values corresponding to the different color pixels used. The color cross product terms are a measure of color correlation, i.e. the extent to which the pixel variations of different colors are correlated. Since noise in digital images is mostly uncorrelated, the color cross product terms indicate the extent of the noise content in the pixels of the source digital image 101.

The calculated noise characteristic table is used in conjunction with spatial filters to produce an enhanced digital image 102 from a source digital image 101. A spatial filter is any method which uses pixel values sampled from a local region about a pixel of interest to calculate an enhanced pixel value which replaces the pixel of interest. Those spatial filters which reduce spatial modulation, for at least some pixels in an effort to remove noise from the processed digital image, can be considered noise reduction filters. Those spatial filters which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method which makes uses of a noise characteristic table to produce an enhanced digital image 102. Spatial filters that adjust a processing control parameter as a function of either the color or numerical value of pixels are adaptive spatial filters. The present invention uses a noise reduction filter and a spatial sharpening filter which are responsive to a noise characteristic table.

Referring to FIG. 2, the preferred embodiment of the present invention employs a noise reduction module 22 as part of the image processing method to produce enhanced digital images 102. As such, the source digital image 101 and the local noise characteristic table 105 are received by the noise reduction module 22 which produces on output a noise reduced digital image.

It is important to note that for many practical digital imaging image systems, other image processing processors need to be included. As long as these other image processing processors accept a digital image as input and produce a digital image on output, more of these type of image processing modules can be inserted in the image processing chain in between a noise reduction module 22 and a spatial sharpening module 23.

The present invention uses a modified implementation of the Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as:

$$q_{mn} = \Sigma_{ij} a_{ij} p_{ij} / \Sigma_{ij} a_{ij}$$

and $$a_{ij}=1 \text{ if } |p_{ij}-p_{mn}|<=\epsilon$$
$$a_{ij}=0 \text{ if } |p_{ij}-p_{mn}|>\epsilon \tag{15}$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (16):

$$\epsilon = Sfac\sigma_n(p_{mn}) \tag{16}$$

where $\sigma_n$ represents the noise standard deviation of the source digital image evaluated at the center pixel value $p_{mn}$ as described by equations (3) and (8) above. The parameter Sfac is termed a scale factor can be used to vary the degree of noise reduction. The optimal value for the Sfac parameter has been found to be 1.5 through experimentation however values ranging from 1.0 to 3.0 can also produce acceptable results. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image. The modified implementation of the Sigma filter is an example of a noise reduction filter that uses a noise characteristic table and is therefore an adaptive noise reduction filter which varies the amount of noise removed as a function of the pixel color and numerical value.

Referring to FIG. 2, the preferred embodiment of the present invention employs a spatial sharpening module 23 as part of the image processing method to produce an enhanced digital image 102. As such, the noise reduced digital image and the local noise characteristic table 105 are received by the spatial sharpening module 23 which produces on output an enhanced digital image 102.

Although the present invention can be used with any spatial sharpening filter which utilizes a priori knowledge of the noise characteristics, the preferred embodiment uses a modified implementation of the method described by Kwon et al. in U.S. Pat. No. 5,081,692. This spatial sharpening method performs an unsharp masking operation by filtering the input digital image with a spatial averaging 2-dimensional Gaussian filter (characterized by a standard deviation of 2.0 pixels) which results in a blurred digital image. The blurred digital image is subtracted from the input digital image to form a high-pass residual. In the method disclosed by Kwon et al. a local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v. i.e. $\phi(v)$.

The present invention modifies the method taught by Kwon et al. to make the amplification factor $\phi(v)$ a function of the estimated noise, i.e. $\phi(v, \sigma_n)$. The amplification function f is given by a gamma function, or integral of a Gaussian probability function, as given by equation (17):

$$\phi(v) = \frac{y_o + y_{\max}\sum e^{-(v-v_o)^2/2s^2}}{y_o + y_{\max}\sum e^{-(v_{\max}-v_o)^2/2s^2}} \tag{17}$$

where $y_o$ represents a minimum amplification factor $y_{max}$ represents a maximum amplification factor, $v_{max}$ represents a maximum abscissa value of the variable v, $v_o$ represents a transition parameter and s represents a transition rate parameter. The variable $v_o$ is a function of the noise standard deviation value $\sigma_n$ as per equation (18)

$$v_o = Sfac_2\sigma_n(p_{mn}) \tag{18}$$

where the scaling factor $Sfac_2$ determines the sensitivity of the sharpening sensitivity to the noise and the noise standard deviation value $\sigma_n$ is as described above in equations (3) and (8). The optimal values for the variables used in equation (18) depend on the digital imaging application. The present invention uses a value of 1.0 for $y_o$ which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variables should be set to values in the range from $v_o/2$ to $v_o/10$ for reasonable results. The variable $v_{max}$ should be set to a value much larger than the expected noise, e.g. 20 times the value of $\sigma_n$.

While the preferred embodiment of the present invention calculates a noise characteristic table and then subsequently uses the noise characteristic table to produce an enhanced digital image, some digital imaging systems may be configured to separate the calculation phase from the enhancement phase. In an alternative embodiment of the present invention, the calculated noise characteristic table is stored with the source digital image 101 as meta-data, i.e. non-pixel information. The source digital image 101 with meta-data can be transmitted to a remote site or stored for safe keeping to be used at a later time or another site. Any of the above mentioned noise characteristic tables can be stored as meta-data. In general a noise characteristic table requires much less memory storage than a set of residual histograms. However, a set of residual histograms can be stored with the source digital image 101 as meta-data.

The invention has been described in detail with particular reference to certain preferred embodiments thereof, but it will be understood that variations and modifications can be effected within the spirit and scope of the invention.

Parts List 10a image capture device
10b image capture device
10c image capture device
20 digital image processor
22 noise reduction module
23 spatial sharpening module
30a image output device
30b image output device
40 general control computer
50 monitor device
60 input control device
70 offline memory device
101 source digital image
102 enhanced digital image
105 local noise characteristic table
106 approximate noise characteristic table
110 noise estimation module
120 residual transform module
130 residual statistic accumulator
132 mask signal generator
140 noise table calculator

What is claimed is:

1. A method of calculating a noise characteristic value for a source digital image, comprising the steps of:
   a) receiving a source digital image including pixels corresponding to two or more different colors;
   b) using a spatial filter and the source digital image to calculate a residual digital image wherein the residual digital image includes color pixels each having pixel values corresponding to the two or more different colors of the source digital image pixels;
   c) using the color pixel values for each pixel of interest in the residual digital image to produce color correlation terms which respectively indicate the extent of the noise content in each of the pixels of interest;
   d) using the color correlation terms and the corresponding residual digital image pixel values to calculate a weighting coefficient for each pixel in the residual image and;
   e) using the residual digital image pixel values and the weighting coefficient to calculate a noise characteristic value for each of the two or more different colored pixels.

2. A method of calculating a noise characteristic value for a source digital image, comprising the steps of:
   a) receiving a source digital image including pixels corresponding to two or more different colors;
   b) using a spatial filter and the source digital image to calculate a residual digital image wherein the residual digital image includes color pixels each having pixel values corresponding to two or more different colors of the source digital image pixels;
   c) calculating one or more color cross product terms for pixels of interest in the residual digital image by multiplying the corresponding color pixel values for each pixel of interest wherein the color cross product terms respectively indicate the extent of the noise content in each of the pixels of interest;
   d) using the color cross product terms and the corresponding residual digital image pixel values to calculate a weighting coefficent for each pixel in the residual image; and
   e) using the residual image pixel values and the weighting coefficient to calculate a noise characteristic value for each of the two or more different colored pixels.

3. The method of claim 2 wherein the step of calculating the noise characteristic values is performed as a function of the numerical values of the source digital image pixels.

4. The method of claim 2 wherein the step of calculating the noise characteristic values is performed as a function of the color and the numerical values of the source digital image pixels.

5. The method of claim 2 wherein the noise characteristic value is a function of the standard deviation of the noise present in the source digital image.

6. The method of claim 2 wherein the spatial filter used in step b) to calculate the residual digital image is a Laplacian spatial filter.

7. The method of claim 2 wherein step c) includes calculating the color cross product term for each combination of different colors for pixels of interest in the residual digital image.

8. The method of claim 7 wherein the color cross product terms are combined by calculating the sum of the absolute value of the individual color cross product terms.

9. The method of claim 7 wherein the color cross product terms are combined by calculating the sum of the squares of the individual color cross product terms.

10. The method of claim 7 wherein the step of combining terms further includes non-lineal modifying the color cross correlation weighting factor.

11. The method of claim 10 wherein the non-linear modifying step includes comparing the color cross correlation weighting factor with a threshold value.

12. The method of claim 10 further including using the modified color cross correlation weighting factor to exclude residual digital image pixel which have a low likelihood of providing an accurate noise estimate from contributing to the calculation of the noise characteristic value.

13. The method of claim 2 further including using the noise characteristic value and the source digital image to calculate an enhanced digital image.

14. The method of claim 13 further including using an adaptive spatial filter responsive to the noise characteristic value to calculate the enhanced digital image.

15. The method of claim 14 wherein the adaptive spatial filter is a spatial sharpening filter or a noise reduction filter.

16. A computer storage medium having instructions stored therein for causing a computer to perform the method of claim 1.

17. A computer storage medium having instructions stored therein for causing a computer to perform method of claim 2.

* * * * *